Aug. 10, 1943.   J. E. BLACK ET AL   2,326,429
GLUE SPREADER, SURFACE COATER, AND THE LIKE
Filed May 1, 1941   9 Sheets-Sheet 1
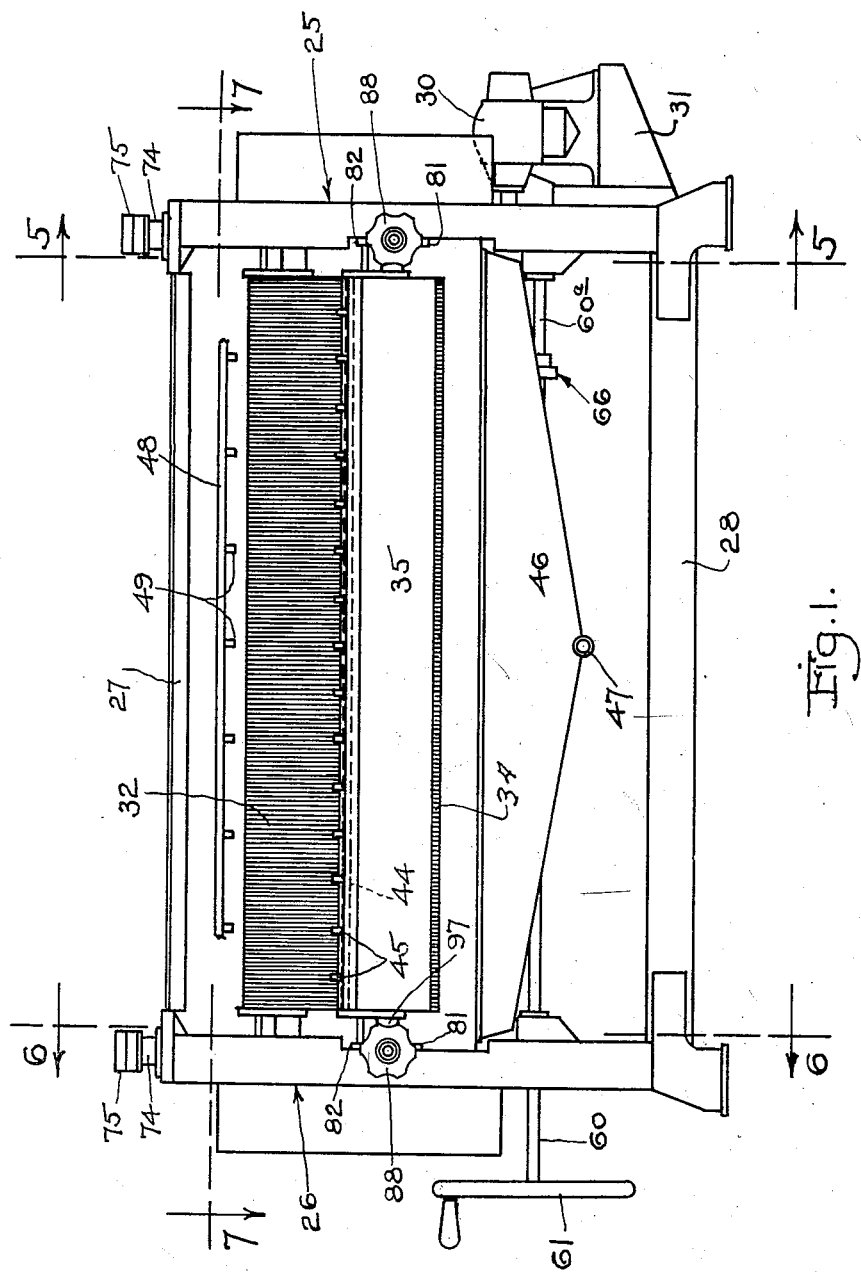
Inventors:
John E. Black &
Robert S. Black,
by Thos. A. Banning
Atty.

Aug. 10, 1943.   J. E. BLACK ET AL   2,326,429
GLUE SPREADER, SURFACE COATER, AND THE LIKE
Filed May 1, 1941   9 Sheets-Sheet 2
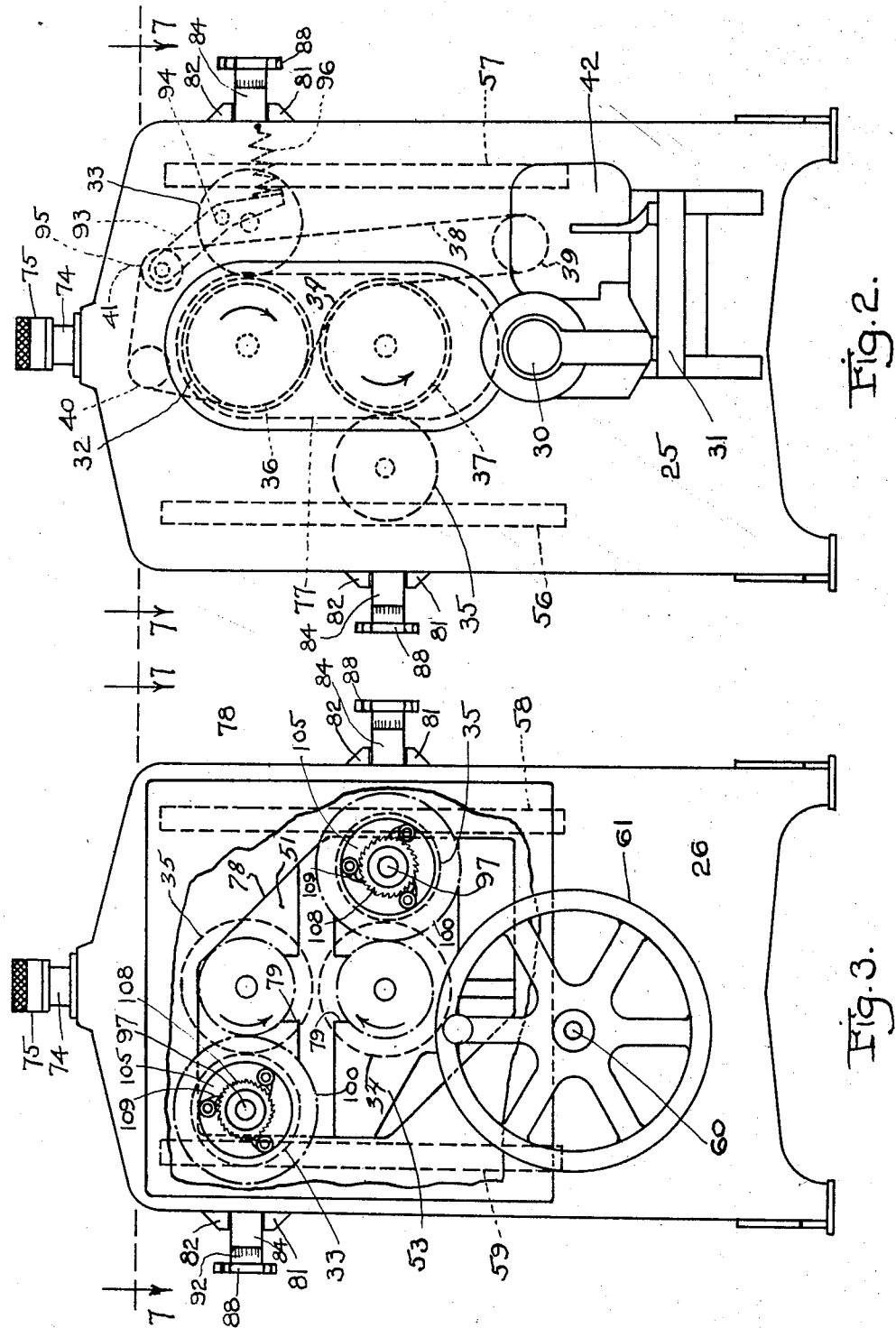
Inventors:
John E. Black &
Robert S. Black,
by Jas. A. Lemmy Jr.
Atty.

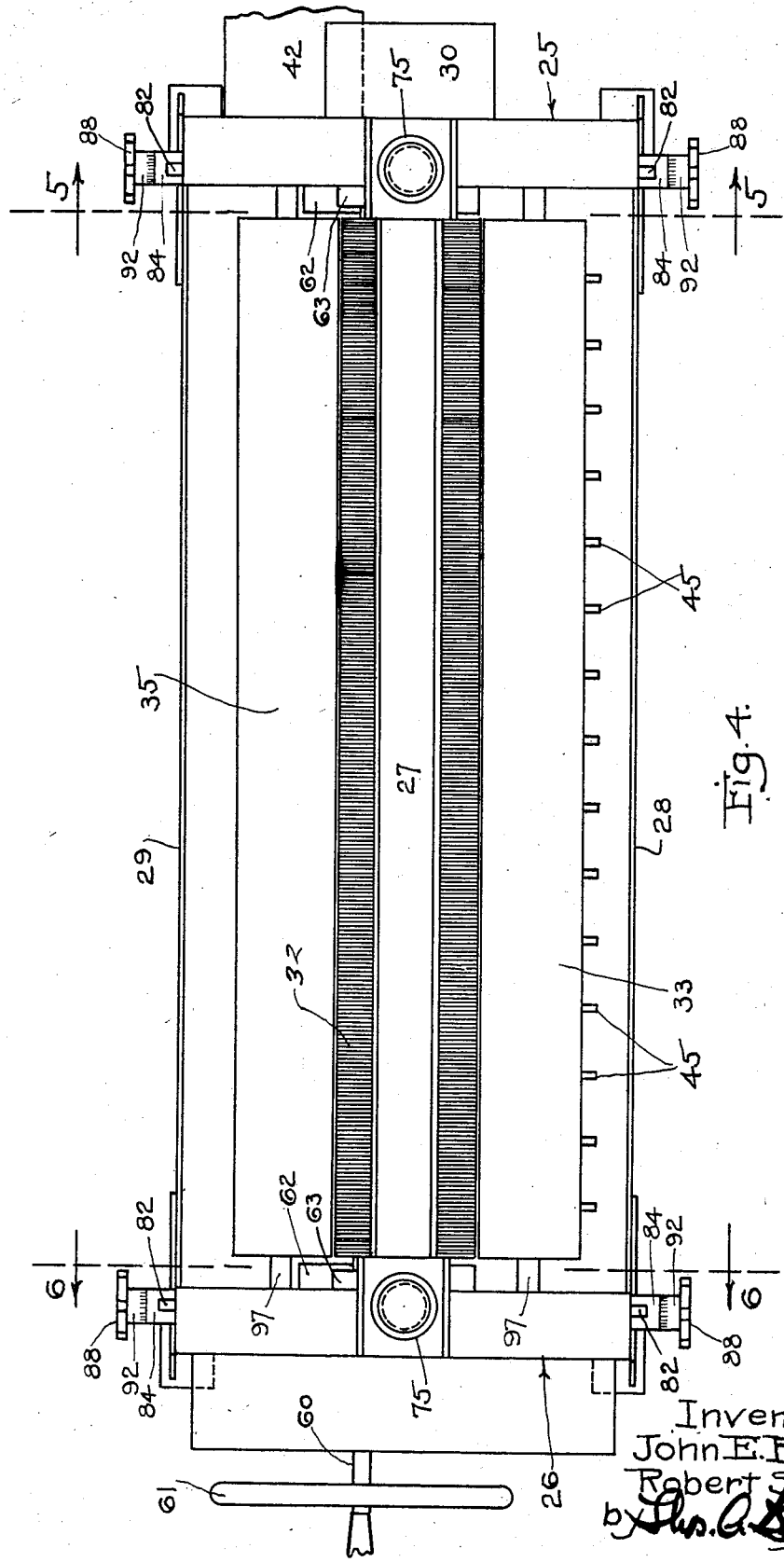

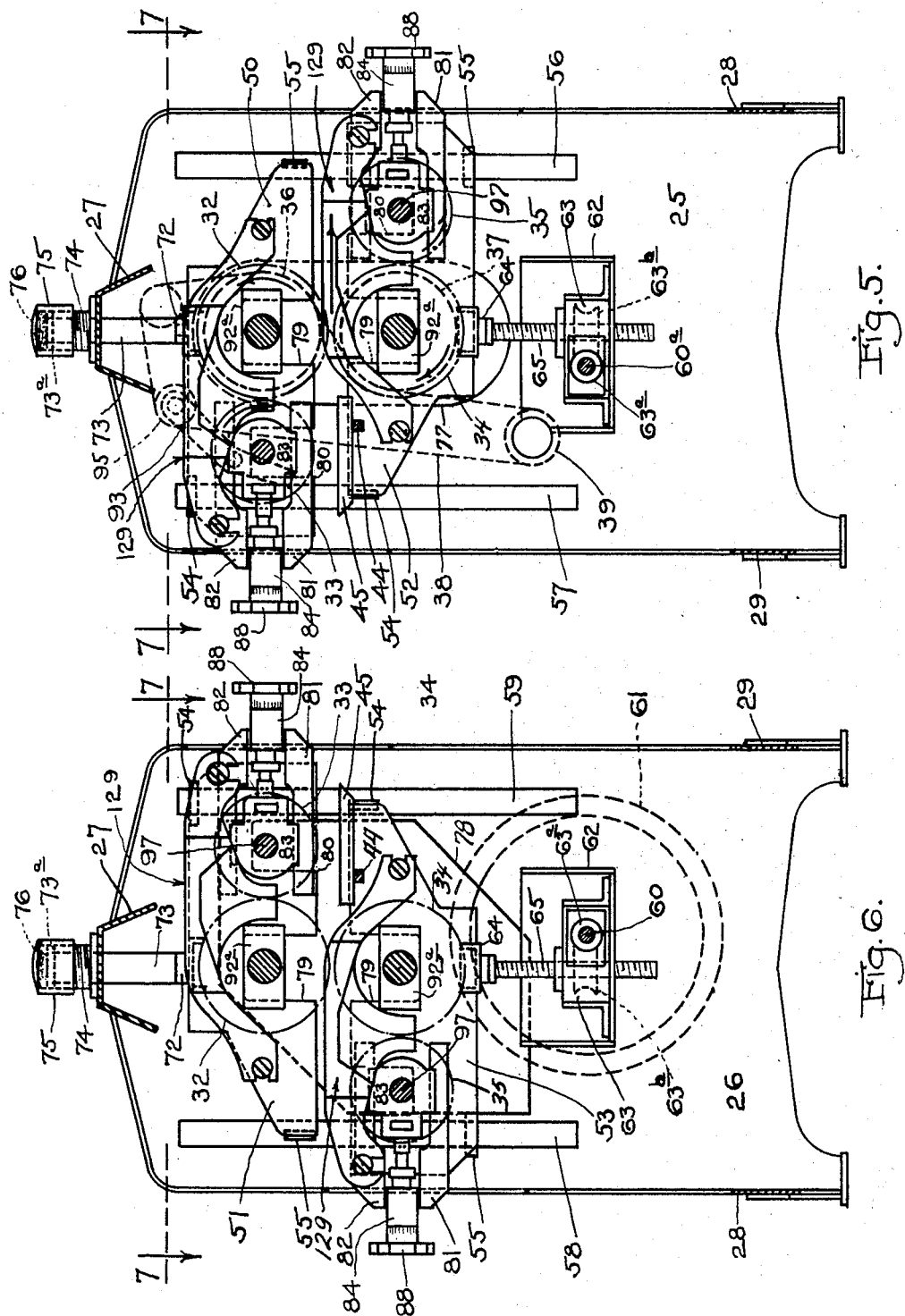

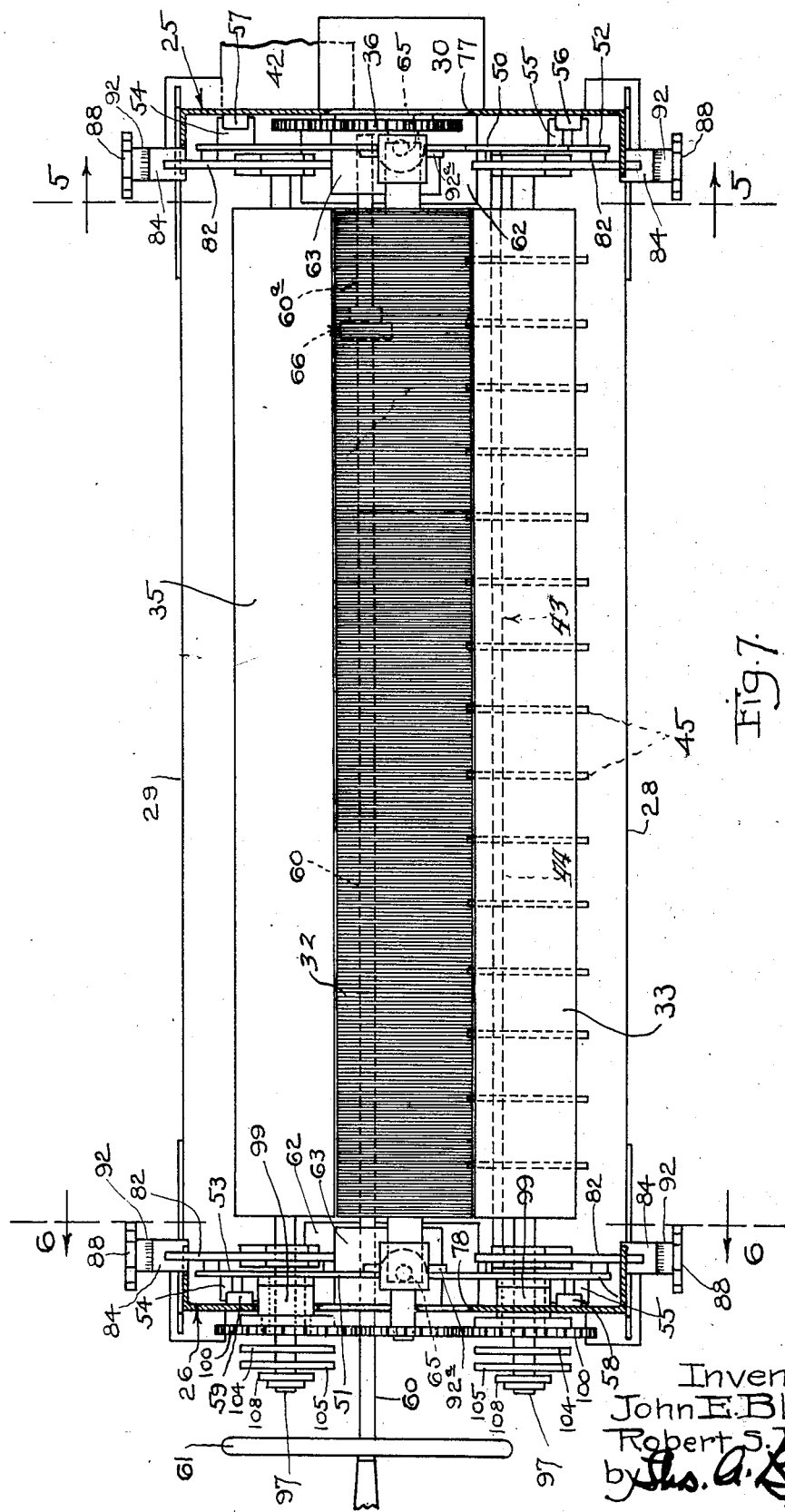

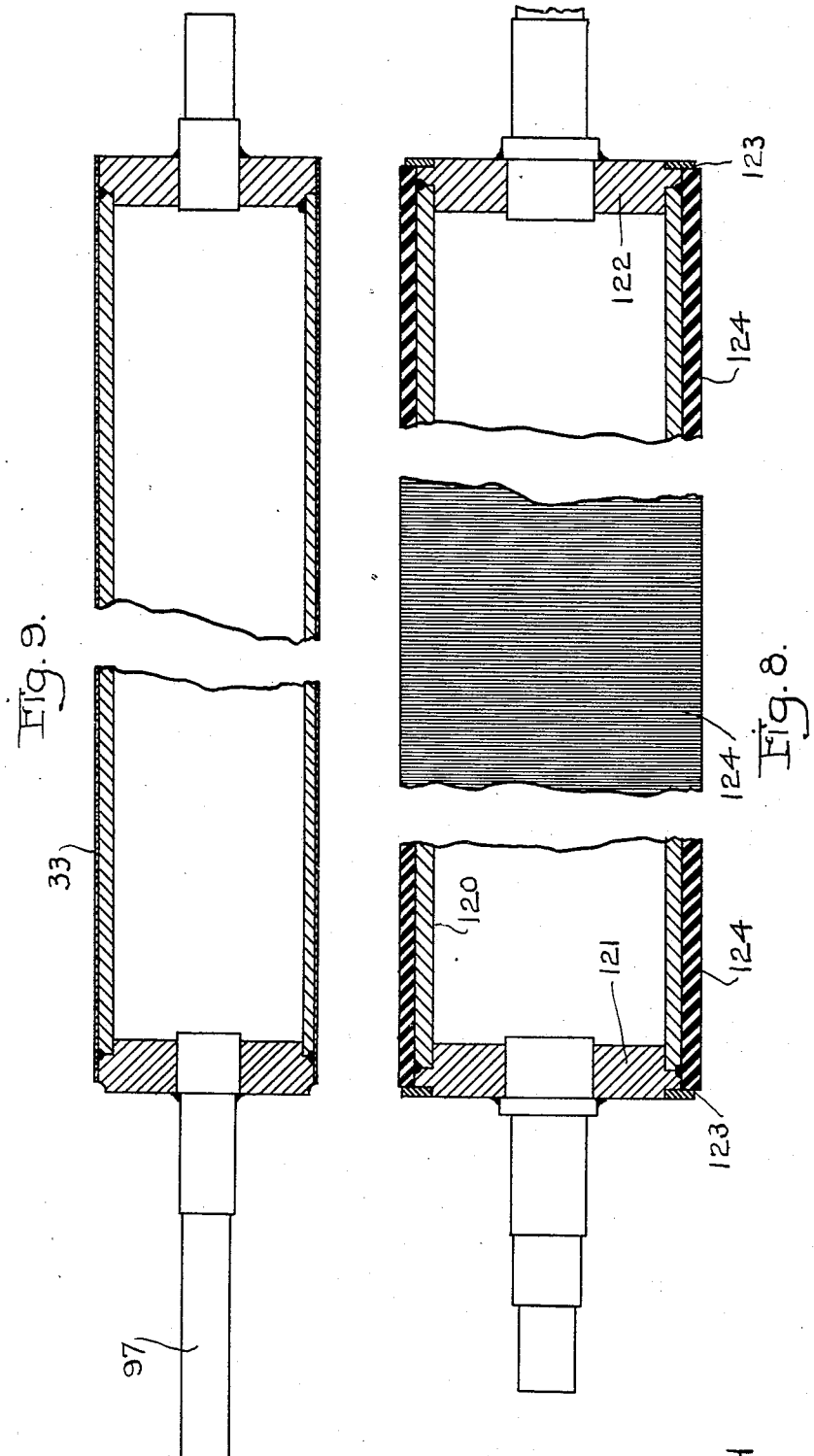

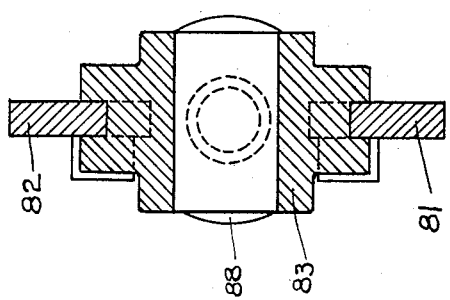
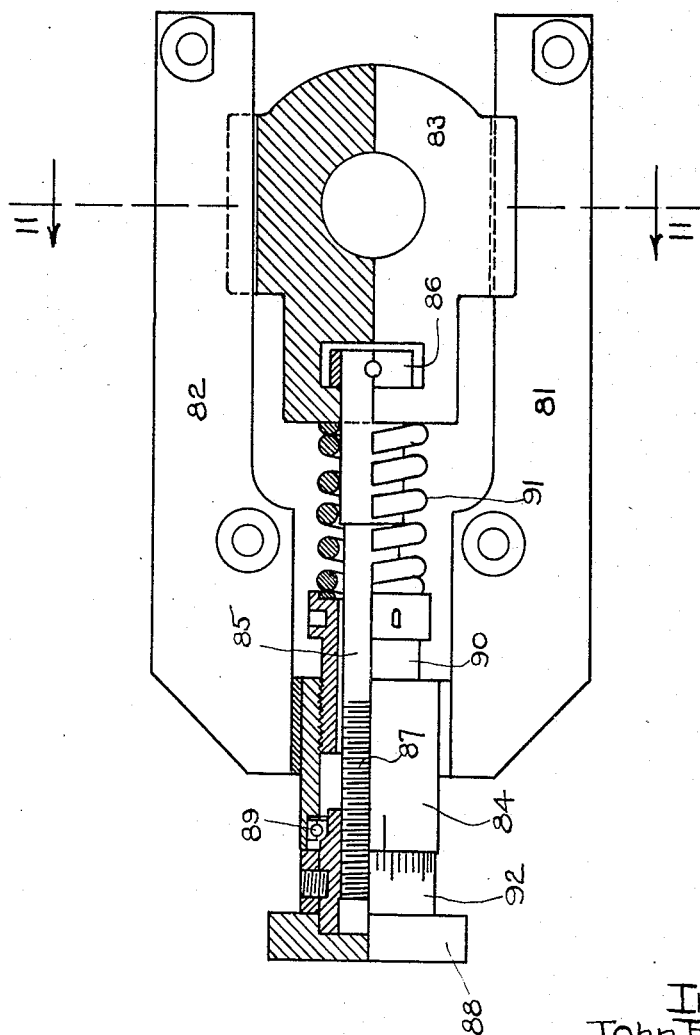

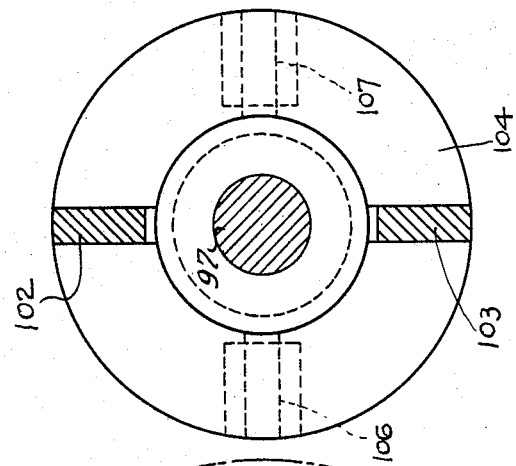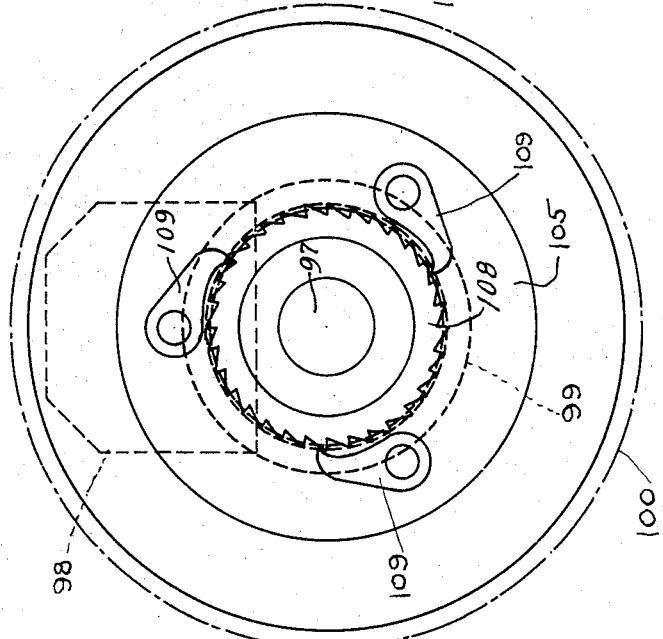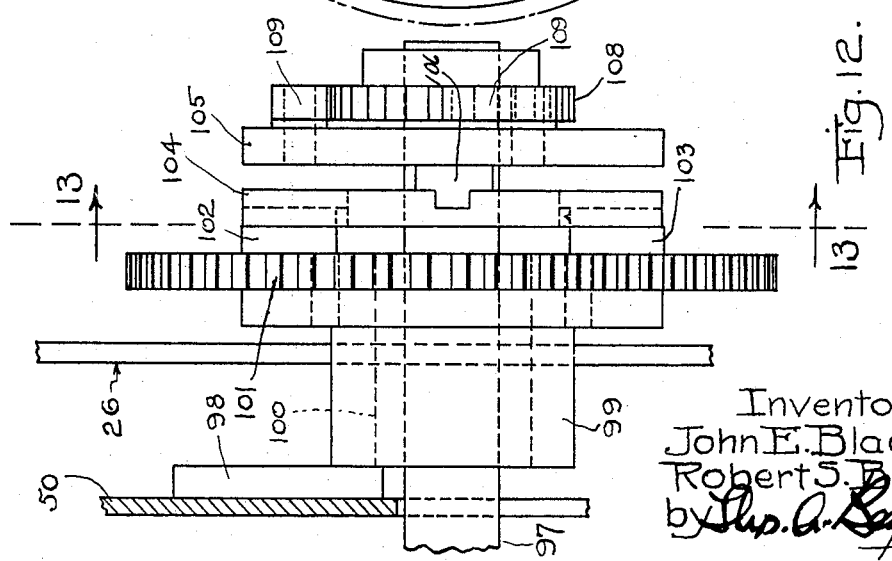

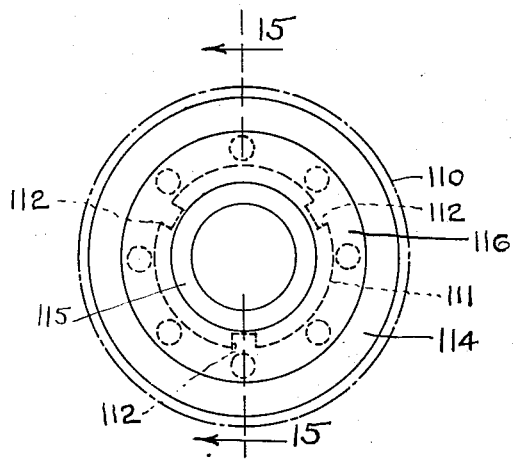
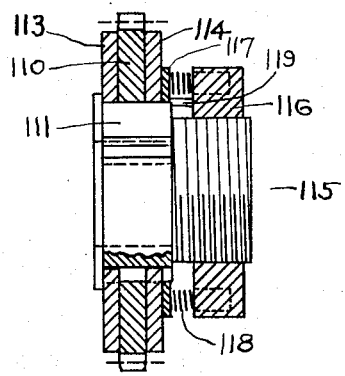
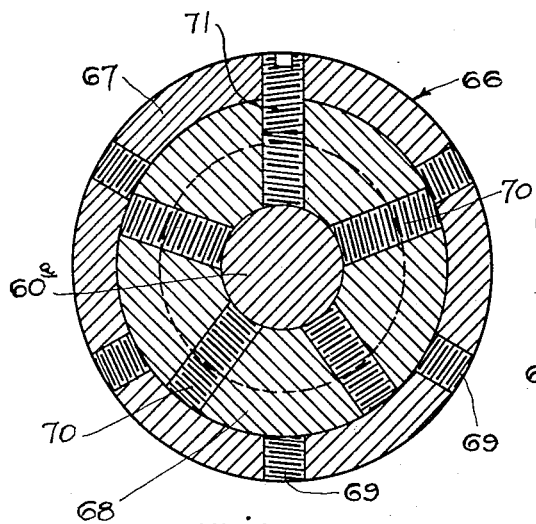
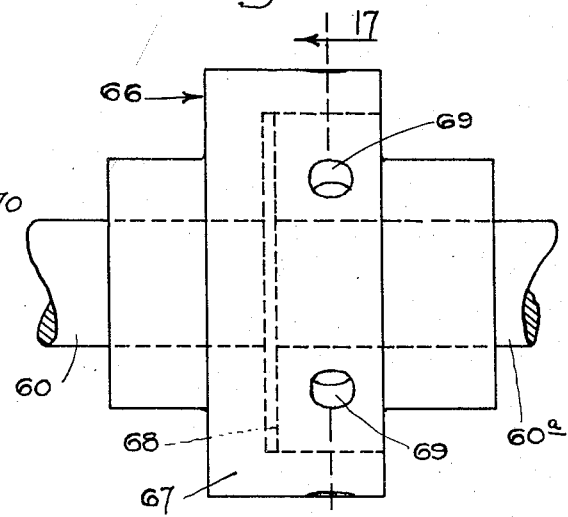
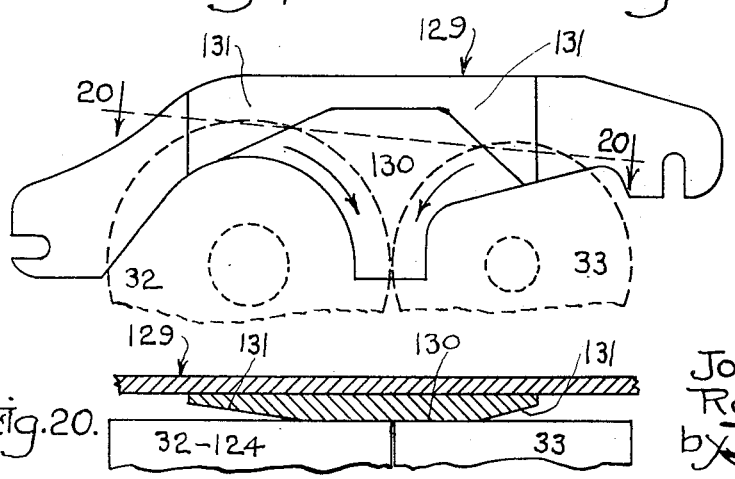
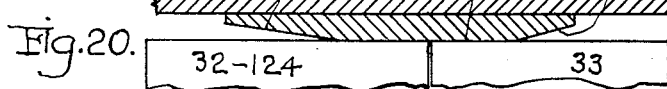

Patented Aug. 10, 1943

2,326,429

UNITED STATES PATENT OFFICE 2,326,429

GLUE SPREADER, SURFACE COATER, AND THE LIKE

John E. Black and Robert S. Black, Mendota, Ill.

Application May 1, 1941, Serial No. 391,324

21 Claims. (Cl. 91—49)

This invention has to do with machines for applying glue, paint, or other coating materials to surfaces such as sheets of veneer, paper, fabric or any other desired stock. For purposes of convenience in description we will hereinafter speak of the machine as a glue spreader; but in so doing we do not intend to limit ourselves to any given use of the machine.

With the above in mind, the invention relates to improvements in glue spreaders especially intended for handling and treatment of relatively large units, capable of spreading glue over the surfaces of relatively large sheets; but it will presently appear that various features of the invention are not limited to use in connection with such large units, but are also usable in units of any size, whether large or small. Furthermore, the improvements herein disclosed have been made with particular reference to spreaders intended for handling cold glues and synthetic resins, such as urea-formaldehydes, caseins, and the like; but it will appear that various features of the invention are not limited to use in spreaders intended for these or any other particular glues, but are of general applicability in this art.

Generally speaking the improvements herein disclosed are applicable to spreaders of the roll type, wherein glue is taken onto the surface or surfaces of one or more rolls, against which roll or rolls the surface to be treated is contacted. One feature of the invention relates to improvements in these rolls, especially in the case of rubber or other specially surfaced rolls. We have found that for the handling of such glues as hereinbefore mentioned very satisfactory results may be secured by the use of a pair or pairs of rolls, one roll of each pair being surfaced with rubber or the like, and the other roll being surfaced with chromium or other similar metal; such latter roll being known as the "doctor" roll.

It is an object of the invention, in connection with these rolls to use a surfacing material which is well adapted to handle the glues, especially such glues as above mentioned, as well as other materials; and in this connection we have found that either natural rubber or neoprene or other artificial rubbers are very well adapted to this work. Surfacings of such materials may be had which will not deteriorate under the influence of the glues (especially urea-formaldehydes, etc.,); said surfacings may be had of the desired medium softness (generally about 40 to 60 on the scale of softness of the Shore durometer); and such surfacings may be finished, either plain or grooved, by simple operations.

It is a further object, when using such yieldable or compressible surfacings as natural or artificial rubber, such as neoprene, to finish them with grooves, either circular or helical, or otherwise, so that the glue is contained within said grooves and will be forced out therefrom when the surfaces are slightly compressed, as by contact with the surface being treated. This will ensure better and more perfectly controlled transfer of the glue to the surface being treated. In this connection, also, we have made provision for very accurate and closely controlled adjustment of the clearance between the upper and lower sets of rolls (as will presently appear), so that the deformation of the yieldable ribs between the grooves of the coated rolls can be controlled to give a very perfect and accurate delivery of the glue or other material onto the surface being treated.

A further feature of the invention relates to improvements in the driving connections between the rolls of each pair. Generally the main or rubber surfaced roll is to be driven faster than the co-operating doctor roll (for example, at a surface speed ratio of about four to one), the surfaces of the two rolls being held in proper positioning and clearance from each other as established by suitable adjusting mechanism. In such case it is desirable to directly drive the main roll from the pulley or driving motor, and to drive the doctor roll by a suitable gear or other connection between the rolls. When a gear connection is used at this location the intermeshing gears should engage on their pitch lines. Now it is desirable to refinish the surfaces of the rolls from time to time as they wear or become damaged, this being especially true of the rubber-surfaced roll. Such refinishing naturally results in change of the roll diameter, so that the rolls must be set with their axes closer together, and in the absence of special provision such resetting of the roll axes would result in throwing the drive off from the pitch lines of the gears. Otherwise it would be necessary to re-cover the rolls to restore their original diameters. It is an object of the present invention to make provision for always ensuring intermeshing of these gears on their pitch lines irrespective of the adjustments of the roll axes towards or from each other, within the limits of adjustment provided for in the structure.

In connection with the foregoing we have provided what may be called a "universal joint" connection in the driving connection between the two rolls, permitting direct driving connection of one of the gears with its roll notwithstanding lateral offset of the axis of such roll from the axis of rotation of the gear thereof. It is a further object of the invention to provide a structure for the above purpose of very simple form and arrangement.

A further feature of the invention relates to improvements in the connection between the two rolls whereby in special cases the rolls may rotate at the same surface or peripheral velocity instead of at different velocities, as normally intended. Normally the rolls are intended to operate without actual surface contact and at different speeds. If in any case the two rolls should make actual contact with each other they should be allowed to rotate at the same surface speed to avoid abrasion and wear or other damage to the rubber surfaced roll. It is therefore a further object of the present invention to make provision for permitting the doctor roll to run ahead of the gear driving connection between the two rolls, being then surface driven by the main or rubber surfaced roll, and at the higher surface speed of the main roll.

It is a further object of the invention to provide a combined driving connection between the two rolls, embodying both the "universal joint" feature and the "run ahead" feature, thereby greatly simplifying the structure, bringing it into small space, and reducing cost of manufacture thereof.

A further feature of the invention relates to the provision of a driving connection between the two rolls, whereby, with a drive of the main roll at constant angular speed (that is, constant speed drive under any given setting of the motor or pulley drive), the doctor roll will be driven at varying angular speed, the angular speed thereof increasing slightly during certain portions of the revolution, and decreasing slightly during other portions of the revolution. By this means we have found that there is secured a better glue delivery from the rolls to the surface being treated, and also that there is secured a better transfer of the glue from the glue pocket between the two rolls to the surface of the main or rubber surfaced roll of the pair. Now it is an inherent feature of certain types of universal joints that with a constant angular speed of the driver there is secured a variable angular speed of the driven element; and it is therefore a further object of the present invention to provide a driving connection between the two rolls embodying this feature.

A further feature of the present invention relates to improvements in the means for sealing or closing the ends of the glue pocket between the pair of rolls. When the two rolls are set into adjustment with respect to each other, and so adjusted as to give the desired clearance between them to ensure delivery of the proper thickness of glue or other film onto the main roll, the space between the rolls and at the ends of the rolls must be closed to provide the glue pocket between the rolls wherein the glue is retained, and from which the glue is taken continuously onto the surface of the main roll during operation thereof. It has heretofore been difficult, if not impossible, to effectively seal the ends of this glue pocket, so as to prevent leakage of glue therefrom, and also to prevent scraping of glue from the ends of the rolls. A further object of the invention concerns the provision of means for sealing these ends of the glue pocket between the two rolls in very simple manner, and also in such manner that leakage at these points and scraping of glue from the roll ends is entirely eliminated. This will also ensure clean and presentable glue spreaders, and will prevent loss of glue, prevent the glue from running down onto other objects, and generally result in an improved machine and operations thereof.

A further feature of the invention relates to the provision of yieldable means to permit the upper set of rolls to move away from their normal position in case of special need. In this connection it is noted that we have herein provided two sets of the rolls, one above the other, so that both surfaces of the sheet may be simultaneously treated. We have also made provision for vertical adjustment of one of these sets of rolls, generally the lower set, so as to accommodate sheets of various thicknesses. In this connection it is a further object of the invention to make provision for simultaneously raising or lowering both ends of the vertically adjustable set of rolls, by means of a single adjustment wheel or the like; and it is a further object to make provision for slight and very accurate adjustments of such raising and lowering mechanism so that both ends of the adjusted set of rolls will be moved exactly the proper amounts, and in proper harmony, so as to make such adjustments with the adjustable rolls exactly parallel to the rolls above them. This will ensure uniform delivery of glue or other material from the entire lengths of the rolls, and so that the surface being treated will be treated uniformly over its entire width. This adjustment means is so constructed that extremely accurate and very small adjustments may be made in the original setting of the device.

The rate of glue delivery from the roll surfaces to the surface being treated will depend largely on the clearance established by the setting of the doctor roll towards or from the corresponding main or rubber surfaced roll. By setting these rolls closer together or further apart the clearance or separation between the rolls will be adjusted, thereby adjusting the thickness of the film of glue or other material being taken onto the surface of the main roll, and likewise adjusting the rate of glue or other material delivery. In this connection we have made provision for very accurate adjustment of this setting at each end of each pair of rolls, with suitable micrometer scales for indicating very accurately the setting at any given time.

A further feature of the invention relates to means for simultaneously and simply driving all the rolls from a single power input, by chain drive or the like, and in simple manner. In this connection it is noted that the lateral and vertical adjustments of the main rolls, due either to change of setting thereof, or to variations during passage of sheets of material through the machine, result in continuous slight changes in the axes being driven. We have therefore made provision for chain take-up automatically, and to maintain the single driving chain always taut and under the desired tension to ensure satisfactory operation.

A further feature of the invention relates to the provision of a structure including upper and lower sets of rolls, and wherein the adjustments of space between said sets of rolls (for acommodation of various thicknesses of veneer or otherwise) are made by moving the lower set of rolls, instead of moving the upper set of rolls as has heretofore been the practice. By this improvement we are able to accommodate the necessary adjustment mechanism within space heretofore not fully occupied in the frame of the machine, and are able to bring the overall height of the machine into smaller compass than heretofore. We are also able in this manner to produce a more rigid and better assembled machine than has heretofore been possible in this class of machines.

Other objects and uses of the invention will appear from a detailed description of the same, which consists in the features of construction and combinations of parts hereinafter described and claimed.

In the drawings:

Figure 1 shows a side elevation of a glue spreader embodying the features of our present invention, looking at the delivery side thereof, the spreader shown being motor driven;

Figure 2 shows an end view of the spreader of Figure 1, looking at the motor drive end thereof, and being on enlarged scale, as compared to Figure 1;

Figure 3 shows an end view corresponding to Figures 1 and 2, but looking at the opposite end of the machine;

Figure 4 shows a plan view of the machine of Figures 1, 2 and 3;

Figure 5 shows a vertical cross-section on the line 5—5 of Figure 1, looking in the direction of the arrows;

Figure 6 shows a vertical cross-section on the line 6—6 of Figure 1, looking in the direction of the arrows;

Figure 7 shows a horizontal section on the line 7—7 of Figures 1, 5 and 6, looking in the directions of the arrows;

Figure 8 shows on enlarged scale a longitudinal section through one of the rubber or other surfaced rolls, the central portion of the roll being broken away to shorten the figure;

Figure 9 shows on enlarged scale a longitudinal section through one of the doctor rolls, the central portion of the roll being broken away to shorten the figure;

Figure 10 shows on enlarged scale a sub-assembly of one of the micrometer adjustments for the ends of the doctor rolls, said figure being partially in section to shown the details of the structure;

Figure 11 shows a cross-section on the line 11—11 of Figure 10, looking in the direction of the arrows;

Figure 12 shows on enlarged scale a sub-assembly of one of the "universal joint" drives at the end of one of the doctor rolls, permitting lateral adjustment of said doctor roll while maintaining gear drive from the main roll without departure from the pitch line of the gears; and including an over-running clutch arrangement in this drive, permitting the doctor roll to be surface driven from the main roll at increased speed, if need be;

Figure 13 shows a cross-section on the line 13—13 of Figure 12, looking in the direction of the arrows;

Figure 14 shows an end view of the device of Figures 12 and 13, and it shows the over-running ratchet and pawl arrangement;

Figure 15 shows a detail section through a modified form of over-running clutch connection, wherein a friction plate arrangement is used in place of the ratchet and pawl arrangement of the previous figures;

Figure 16 shows an end view of the device of Figure 15;

Figure 17 shows a detail cross-section through the means whereby the two ends of the lower set of rolls may be brought into exact permanent adjustment, with the rolls of the lower set exactly parallel to those of the upper set;

Figure 18 shows a side elevation of the device of Figure 17;

Figure 19 shows a face view of one of the end plates for closing the glue pocket at one end of a pair of rolls with a very perfect seal; and Figure 20 shows a cross-section on the line 20—20 of Figure 19, looking in the direction of the arrows.

In the arrangement shown in the drawings we have shown a four roll arrangement including two sets of rolls, each including a main or rubber or other yieldable faced roll and a doctor roll co-operating therewith. The arrangement is such that both of the main rolls are driven at one end of the machine by the driving motor; and such that at the opposite end of the machine each of these main rolls drives its corresponding doctor roll through the improved form of drive connection hereinafter described in detail. The arrangement is also such that both of the main rolls remain on axes which do not shift laterally, but are vertically shiftable or movable, the corresponding doctor rolls shifting or moving vertically therewith; and is such that the rolls of the lower set may be adjusted vertically according to the thickness of the stock to be treated, the rolls of the upper set being yieldably retained, but yieldable under spring pressure.

The machine illustrated includes the two end frames or stands 25 and 26 at the motor and back ends, respectively. Suitable longitudinally extending members join these end frames together into a rigid assembly, these being shown at 27, 28 and 29. The arrangement shown includes the driving motor 30 carried by a bracket 31 on the end frame 25; but manifestly any other suitable driving scheme may be used, as for example a pulley and belt drive.

The upper set of rolls includes the main roll 32 and the doctor roll 33; and the lower set of rolls includes the main roll 34 and the doctor roll 35. The main rolls carry the sprockets 36 and 37 on their ends adjacent to the frame or stand 25; and these are simultaneously driven by the chain 38 which passes over the driving sprocket 39, and over the two idler sprockets 40 and 41. Generally there will be provided some form of gear reduction between the motor (or pulley) and the sprocket 39, and in the scheme shown we have provided the gear box 42 which is driven by the motor, and which gear box in turn drives the sprocket 39 already referred to. If desired this gear box 42 may include suitable change speed arrangements, whereby it is possible to drive the sprocket 39 (and therefore the rolls) at different fixed speeds; otherwise the rolls will always rotate at a single speed.

A convenient form of rack 43 may be carried by the end frames or otherwise supported, said rack including the longitudinal rod or bar 44 whose ends are suitably carried by the machine, and also including the transverse fingers 45 at relatively small spacings so that the sheets being treated will be properly supported as they approach the rolls, and will be directed between the sets of rolls. Sometimes it will be desirable to carry this rack by the same end plates (presently to be described) whereby the rolls of the lower set are carried, so that during vertical adjustments of the rolls the rack will always maintain proper position relative to the rolls. If desired a similar rack may also be provided at the exiting side of the sets of rolls, so that the sheet will be well directed away from the rolls after the treatment has been completed. This will also serve to give support to large sheets during treatment.

Sometimes a pan 46 may be provided beneath the lower set of rolls to receive any glue which may drip from the rolls, said pan conveniently being provided with a drain connection 47. Sometimes, also, a glue supply pipe or pipes 48 may be extended along the machine and above one or both sets of rolls (or the pocket between them) for continuous supply of glue to such pocket, such pipe being provided with spouts 49 spaced along its length at such intervals as good practice may require. When the above arrangement is used a suitable pump or the like may be used for continuous supply of glue to the pipe or pipes 48, such pump being suitably driven, as by a connection to the motor or gear box, and drawing its supply of glue from the drain connection 47 or elsewhere.

At each end of the machine, and adjacent to the corresponding end frame, there are provided the upper and lower bracket plates, same being shown at 50 and 51 (upper), and 52 and 53 (lower). Each of these is provided with the upper and lower guide channels 54 and 55 which work on the vertical guide rods or bars 56, 57, 58 and 59, as the case may be, so that during vertical movements of these bracket plates they are properly guided. Conveniently the guide bars 56 and 57 are carried by the end frame 25 and the guide bars 58 and 59 by the end frame 26, being suitably mounted against the inside faces of said end frames.

Extending lengthwise of the machine is the vertical adjustment shaft 60. This shaft reaches through the end frame 26 and carries a hand wheel 61 by which it may be rotated for vertical adjustments of the lower set of rolls. Mounted on the inner face of each of the end frames 25 and 26 is a bracket 62, and gear boxes 63 are carried by these brackets. Each of these gear boxes includes a worm 63ᵃ working on a horizontal axis and carried by the shaft 60; and also includes a worm gear 63ᵇ working on a vertical axis and meshing with the corresponding worm. By this means, rotation of the shaft 60 serves to simultaneously rotate both of the worm gears (one at each end of the machine), and by proper construction both of the worm gears will rotate through equal angular amounts with a given shaft turn.

Each of the bracket plates 52 and 53 carries a socket 64 which receives and is locked to the upper end of a vertical screw shaft 65, and the screw shafts 65 work in the worm gears 63ᵇ within the gear boxes 63, being threaded thereinto in well understood manner. Thus the rotation of the shaft 60 will serve to raise or lower both of the bracket plates 52 and 53 with equal movements, the screw shafts 65 not rotating and serving as supports for the bracket plates. Now it is intended that both of these bracket plates should always stand at the same elevation, so that the lower set of rolls shall always remain horizontal and parallel to the upper set of rolls. To bring the parts into initial adjustment for accomplishing this result we have made the following provision: The shaft 60 is divided into two sections 60 and 60ᵃ, and between these sections we place a lock clutch element 66, which includes the companion blocks or sleeves 67 and 68, one within the other, one secured to the shaft section 60 and the other secured to the shaft section 60ᵃ. The block or sleeve 67 is provided with several radial threaded openings 69, for example six, and the block or sleeve 68 is provided with a different number of radial threaded openings 70, for example, five; and a pin 71 may be threaded through any one of the openings 69 and into any one of the openings 70, to lock the sections together. By this scheme it is possible to secure angular variations as between the shaft sections 60 and 60ᵃ, equal in number to the product of the numbers of openings in the two sections, so that in the assumed case we are able to secure thirty different angular adjustments as between the two shaft sections. Taking into account the fact that the drive from the shaft 60 to the vertical screws is through a worm and worm gear, we are able to thus get an adjustment of great fineness in the initial setting of the machine, to ensure exact parallelism of the upper and lower sets of rolls.

Each of the upper bracket plates 50 and 51 is provided with a socket 72; and a pin 73 has its lower end threaded into such socket 72. There is a housing 74 mounted on the top of each of the end frames 25 and 26, a cap 75 being screw-threaded onto each of these housings so that such cap can be threaded up and down. The upper end of the stem or pin 73 has a shouldered head 73ᵃ to seat on the top edge of the housing 74, and thereby retain the stem from further downward movement, but allowing the stem to rise within the housing. A stiff spring 76 is placed between each cap 75 and the upper end of the pin 73, so that the bracket 50 or 51 as the case may be, will be held under spring pressure downwardly to a limited position. With this arrangement it will be seen that as sheets of material are fed between the rolls the upper set of rolls can yield to accommodate irregularities in stock thickness or, within limits, to accommodate variations in stock thickness fed to the rolls.

The end frame member 25 at the driving end of the device is provided with an opening 77, and the end frame member 26 at the opposite end of the device is provided with an opening 78. These openings let the roll shafts through the end frame members, and also permit the necessary vertical and lateral movements of said roll shafts. Suitable covers or housings may be provided over these openings, as desired.

Each of the bracket plates 50, 51, 52 and 53 is provided with an opening 79 for the main or surfaced roll, and an opening 80 for the corresponding doctor roll. Mounted on each of the bracket plates there are the guides 81 and 82, properly placed with respect to the opening 80 of such bracket plate; and a journal block 83 for the doctor roll shaft is slidably carried by said guides, so that said shaft can be set back and forth with respect to the bracket plate. To secure such back and forth setting, and to provide for a very accurate adjustment in the setting, and to indicate the exact position of the setting at any given time, we have secured the thimble 84 between the outer ends of the guides 81 and 82 (as by welding or otherwise). Then the rod 85 is extended through the thimble and has its inner end connected to the journal block 83 by the journalled connection 86, the outer end portion of this rod being finely threaded as shown at 87. A hand wheel 88 (preferably knurled or otherwise threaded) is secured to the outer end of this rod so that said rod may be readily turned by the hand wheel to an exact adjustment, thereby pulling the rod (or releasing it) to the exact position desired. Preferably a ball bearing 89 is provided between this hand wheel and the end of the thimble, since the rod 85 is always under tension, as will presently appear.

Another thimble 90 is threaded into the inner end of the thimble 84 so that it can be adjusted in or out by use of a spanner wrench or otherwise; and a stiff spring 91 is placed between the adjacent ends of the journal block 83 and thimble 90. It will thus be evident that the spring 91 tends at all times to force the journal block of the doctor roll towards the corresponding main roll; that the strength of the spring pressure may be adjusted as desired; and that the limitation of movement under impulse of the spring will be determined by the setting of the hand wheel 88. (It is noted that provision is made in the connection 86 for slight backing up of the journal block against the force of the spring.) We also provide at the hub of the hand wheel a collar 92 turning with the hand wheel, and carrying micrometer markings to show the position of turn of the hand wheel, which markings may of course be read in connection with a suitable mark on the thimble 84.

With the foregoing arrangement it will be evident that we have made provision for very accurate setting of the journal block of the doctor roll laterally towards or from the main roll, while still providing for slight lateral shifts of the doctor roll away from the main roll in case of urgent need. Still the stiff spring 91 is strong enough to resist ordinary lateral moving tendencies of the doctor roll, and to maintain the doctor roll in proper adjusted position of clearance from the main roll for the desired film thickness.

Suitable journal arrangements may be and are provided for the ends of the main rolls, with respect to the bracket plates, so that said rolls are always journalled with respect to the bracket plates, and are moved up and down with the bracket plates. These are the journals 92a, the details of which need not be here given, beyond the fact that said journals are preferably self-centering. In this connection it will be remembered that the main rolls carry the sprockets 36 and 37 by which they are driven, and that said sprockets rise and fall with the main roll shafts.

There is a lever or finger 93 pivoted to the end frame 25 at the point 94 and adjacent to the run of the chain. One end of this lever carries the idler sprocket 95 which presses against the chain, and a spring 96 serves to rock the lever to ensure proper pressure of the sprocket against the chain, and corresponding chain take-up at all times. This ensures that the chain will always be taut, and provides for changes in position of the sprockets on the main roll shafts, such as are due to rising and falling of the main rolls either during intentional adjustment, or due to thickness of sheets being passed between the rolls.

Now it is evident that the main rolls are directly driven by the chain; and provision is made for driving each doctor roll from its main roll, such driving means being adjacent to the end frame 26 at the end of the machine opposite to the motor drive end. We will now explain the same.

The doctor roll shaft is shown at 97 (see Figures 13, 14 and 15). Secured to the bracket plate 50, 51, 52 or 53 as the case may be, is a bracket element 98 having a downwardly extending bearing collar 99 of size to pass the doctor roll shaft with enough clearance to allow for all lateral movements of said shaft. This collar extends through the opening in the end frame 26 with a bearing neck 100, whereon is journalled the plate 101. The plate 101 is provided with peripheral teeth and constitutes a gear element which is driven from the end of the corresponding main roll shaft by a meshing gear, presently to be explained. The face of this plate 101 is provided with two radially extending flanges 102 and 103. Next to the face of the plate 101 there is a floating universal coupling plate 104; and just beyond this universal coupling plate 104 there is the shaft plate 105, also having the two radially extending flanges 106 and 107. The universal coupling plate 104 is provided on one face with radially extending diametrically opposed grooves to receive the flanges 102 and 103 of the plate 101, and is provided on the other face with grooves at right angles to the first mentioned grooves to receive the flanges 106 and 107. With this arrangement it will be evident that driving will be effected from the plate 101 to the plate 105 with a universal joint coupling drive, and notwithstanding that the shaft 97 on which the plate 105 is mounted, and to which it is secured, may not be in alignment.

The plate 105 is mounted on the shaft 97, preferably with a clutch or over-running connection. In the arrangement shown in Figures 13, 14 and 15 a ratchet wheel 108 is keyed to the end of the shaft 97, and a pawl or pawls 109 is or are carried by the face of the plate 105 to engage the teeth of such ratchet. Preferably three pawls are provided, set at positions to successively engage the teeth, so that ratcheting will occur with three times the frequency of the number of teeth on the ratchet wheel itself. Furthermore, this ratchet wheel and teeth and pawl are so arranged that normally drive will occur from the pawl (or pawls) to the ratchet wheel, thus ensuring drive from the main roll shaft to the doctor roll shaft, such drive being preferably with the main roll at much greater rate than the doctor roll (for example, four to one, surface speed); but in case of surface contact of the doctor and main rolls, thereby requiring the doctor roll to rotate at speed greater than normal (for the rate of the main roll), the doctor roll may run ahead of the proper rate, and with the pawls clicking over the ratchet teeth.

We have shown in Figures 15 and 16 a modified arrangement permitting over-running of the doctor roll under such conditions as above stated. In this case the plate 110 constituting one of the gear elements is freely journalled on the bushing 111, which bushing is provided with one or more key ways 112 (preferably three). At the faces of the plate 110 are the plates 113 and 114 which are keyed to the bushing and therefore are driven by the bushing or else drive the same. The bushing 111 has the threaded extension 115 whereon is threaded the nut element 116. A plate 117 is freely journalled on the bushing, and a plurality of springs 118 extend between the nut element 116 and the plate 117. By adjusting the nut element the pressure exerted by the friction plates 113 and 114 against the faces of the plate 110 may be adjusted so that over-running may occur under the pre-selected conditions of surface contact between the rolls. If desired one or more pins 119 may be extended between the nut element 116 and the plate 117 to ensure that these parts will always rotate together and thus prevent distortion of the springs. Preferably the plate element 110 is made of brake band material or the like, since it must have a suitably high co-efficient of friction with the plates with which it engages, and must resist wear under the operating conditions encountered.

Referring now to Figure 8 we will explain the form of the rubber faced or yieldable faced roll herein disclosed. It is shown as being formed of the hollow tube or cylinder 120 having its ends welded or otherwise secured to the hubs 121 and 122; and preferably a slight flange or shoulder 123 is formed at each end of the cylinder, as well shown in Figure 8. The end hubs or plates are provided with short shaft sections constituting the shafts of the roll. The cylinder is covered with a layer of neoprene or other rubber or rubber like material, or natural rubber, preferably coated thereon by a wrapping or moulding or spraying or other depositing operation, and to a thickness sufficient to provide the desired degree of softness of the surface, and to allow for numerous resurfacing operations as needed from time to time. This layer of rubber or rubber like material is shown at 124. It may have an initial thickness of as much as one-half to three-quarters of an inch, and may be finally resurfaced down to a thin layer, sufficient to provide the grooves which may be relatively fine, in its surface.

The surface of the rubber surfaced roll is preferably finished to provide an encircling groove or grooves, rather fine, so that the glue or other material will be received therein at the position of the glue pocket, and so that pressure of the roll surface against the surface of the sheet being treated will serve to cause delivery of the glue from such groove or grooves to the said surface. The compression of the surface of the main roll against the surface being treated will depend on the setting of the lower set of rolls with respect to the upper set of rolls; and as we have already explained provision is herein made for adjusting the lower set of rolls up and down with respect to the upper set of rolls, and for ensuring that the lower rolls shall be exactly parallel to the upper set so that delivery of the glue or other material to the surface being treated will be uniform across the entire width of such surface. The quantity of glue delivered per unit of area being treated will depend on the thickness of the film taken onto the main or rubber or other coated roll; and that thickness will be adjusted by the micrometer setting of the doctor roll with respect to the main roll.

The glue or other material supplied to each set of rolls is retained in the pocket between said rolls. The main roll of the upper set rotates to carry a film of the glue or other material down and in the direction of sheet movement; and the main roll of the lower set rotates in direction (opposite to that of the main roll of the upper set) to carry a film of the glue or other material down and under and then up to contact against the lower face of the sheet in the direction of travel of the sheet. These movements are shown by the arrows in Figures 5 and 6.

To close the pockets between the sets of rolls at the ends thereof we have provided end plates of the form shown in Figures 19 and 20. The end plate therein shown is indicated by the numeral 129. It is suitably supported by the bracket plate 50, 51, 52 or 53 as the case may be, and adjacent to the roll ends by suitable studs or the like which may be adjusted to ensure proper contact with the roll ends. That portion of the end plate contacting the roll ends is flat as shown at 130; and from this flat surface the surface is beveled or relieved away from the roll ends as shown at 131. Consequently as the rolls rotate their cylindrical surfaces come to engagement with the flat portion 130 by riding over or past the said beveled or relieved surfaces 131. As a consequence any glue or other material projecting slightly beyond the end of the roll is gradually wiped back onto the cylindrical roll surface instead of being scraped off from the roll; and such material is thus returned back into the pocket for re-use, and is effectively prevented from dripping down from the ends of the rolls. Thus a very clean and presentable machine is provided, drippage is prevented, and the waste of glue or other material is completely eliminated.

Preferably the surface of the end plates (both 130 and 131) is made from some relatively soft material, such as Babbitt metal or the like. This may be applied over the entire surface of the end plates, and afterwards the beveled or relieved portion 131 may be readily provided by cutting away some of this Babbitt or other soft metal in the proper manner.

We claim:

1. In a surface coater or the like, the combination of a pair of rolls, one being a main roll and the other being a doctor roll, means to drive one end of the main roll, means to shift the doctor roll laterally with respect to the main roll for adjustment purposes, a pair of intermeshing gears adjacent to the other ends of the rolls, a connection between one gear and the main roll, and a universal joint connection between the other gear and the doctor roll permitting lateral shifting of the doctor roll with respect to said other gear while maintaining meshing engagement of the two gears on their pitch lines, substantially as described.

2. In a surface coater or the like, the combination of a pair of rolls, one being a main roll and the other being a doctor roll, means to drive one end of the main roll, means to shift the doctor roll laterally with respect to the main roll for adjustment purposes, a pair of intermeshing gears adjacent to the other ends of the rolls, a connection between one gear and the main roll, and means to drivingly connect the other gear and the doctor roll, including a universal joint connection permitting lateral shifting of the doctor roll with respect to said other gear while maintaining meshing engagement of the two gears on their pitch lines, and also including an over-riding connection permitting normal drive of the doctor roll from the main roll and permitting the doctor roll to run ahead of such normal drive, substantially as described.

3. In a surface coater or the like, the combination of a pair of rolls, one being a main roll and the other being a doctor roll, means to drive one end of one roll, means to shift the other roll laterally for adjustment of the separation between the axes of the rolls, a pair of intermeshing gears adjacent to the other ends of the rolls, a connection between one gear and the first mentioned driven roll, and means to drivingly connect the other gear to the other roll, including a universal joint connection permitting lateral shifting of said other roll with respect to said other gear while maintaining meshing engagement of the two gears on their pitch lines, substantially as described.

4. In a surface coater or the like, the combination of a pair of rolls, one being a main roll and the other being a doctor roll, means to shift one of the rolls laterally for adjustment of the separation between the axes of the two rolls, means to drive one end of one roll, a pair of intermeshing gears on the other ends of the rolls, said gears rotating on fixed axes and with engagement on their pitch lines, and a connection between each gear and its roll, one of said connections being a universal joint connection, substantially as described.

5. In a surface coater or the like, the combination of a pair of rolls, one being a main roll and the other being a doctor roll, a surfacing of rubber like material on the main roll, a surfacing of metal of the chromium series on the doctor roll, means to drive the rolls harmoniously with the main roll rotating at greater surface speed than the doctor roll, together with means to shift one of the rolls laterally with respect to the other roll for adjustment purposes, substantially as described.

6. In a surface coater or the like, the combination of a pair of rolls, one being a main roll and the other being a doctor roll, a surface of yieldable material on the main roll, together with spring means tending to force the doctor roll towards the main roll, and means to limit such forcing movement under impulse of said spring, and means to adjust the force of the spring means, substantially as described.

7. In a surface coater or the like, the combination of a pair of rolls, one being a main roll and the other being a doctor roll, a surface of yieldable material on the main roll, together with spring means tending to force the doctor roll towards the main roll, and manually adjustable means to limit movement of the doctor roll towards the main roll under said spring tendency to thereby limit the clearance between the rolls, and means to adjust the force of the spring means, substantially as described.

8. In a surface coater or the like, the combination of a pair of rolls, one being a main roll and the other being a doctor roll, a surface of yieldable material on the main roll, a groove encircling said main roll, together with spring means tending to force the doctor roll towards the main roll, and means to limit movement of the doctor roll towards the main roll under said spring tendency to thereby limit separation of the rolls from each other, and means to adjust the force of the spring means, substantially as described.

9. In a surface coater or the like, the combination of a pair of rolls, one being a main roll and the other being a doctor roll, a surface of yieldable material on the main roll, a series of grooves encircling the main roll from end to end thereof, together with spring means tending to force each end of the doctor roll towards the main roll, manually adjustable means to limit movement of the doctor roll towards the main roll under impulse of each of said spring means, to thereby enable independent adjustment of the clearance between the rolls at each end of the pair of rolls, together with micrometer means to indicate the adjustment of each of said manually adjustable means, and means to adjust the force of the spring means, substantially as described.

10. In a surface coater or the like, the combination of a pair of rolls, one being a main roll and the other being a doctor roll, a surface of yieldable material on the main roll, a series of grooves encircling the main roll from end to end thereof, together with spring means tending to force each end of the doctor roll towards the main roll, and manually adjustable means to limit movement of the doctor roll towards the main roll under impulse of each of said spring means, to thereby enable independent adjustment of the clearance between the rolls at each end of the pair of rolls, and means to adjust the force of the spring means, substantially as described.

11. In a surface coater or the like, the combination of a pair of rolls, one being provided with a surface of yieldable material having therein a series of encircling grooves, and the other roll being provided with a hard surface, spring means tending to move both rolls towards each other, together with manually adjustable means to limit movement as aforesaid, to thereby limit clearance between the rolls for control of thickness of the film of glue or the like on the main roll, and means to adjust the force of the spring means, substantially as described.

12. In a surface coater or the like, the combination of a pair of rolls, one being provided with a surface of yieldable material having therein a series of encircling grooves, and the other roll being provided with a hard surface, spring means tending to move both rolls towards each other at each end of the device, together with manually adjustable means to limit movement of each end of the rolls towards each other under said spring tendency, to thereby control the separation between the rolls, and means to adjust the force of the spring means, substantially as described.

13. In a surface coater or the like, the combination of a pair of rolls, one being a main roll and the other being a doctor roll, means to ensure rotation of said rolls harmoniously and in opposite directions of rotation, means to retain said rolls in slight separation from each other to thereby establish a pocket between the rolls, together with means to close each end of said pocket, comprising a plate at that end of the pocket lying substantially normal to the axis of rotation of the rolls, said plate having a flat surface in contact with the roll ends and its surface tapered away from said flat surface, whereby during rotation of the rolls the end of the surface of each roll engages said flat plate surface with a gradually increasing engagement, substantially as described.

14. In a surface coater or the like, the combination of a pair of rolls, one being a main roll and the other being a doctor roll, means to ensure rotation of said rolls harmoniously and in opposite directions of rotation, means to retain said rolls in slight separation from each other to thereby establish a pocket between the rolls, together with means to close each end of said pocket, comprising a plate at that end of the pocket having its pocket surface flat and in contact with the ends of the rolls and tapered axially outward measured in a direction against the direction of roll rotation, whereby during roll rotation the roll surface engages said flat plate surface with an increasing engagement to ensure gradual wiping contact, substantially as described.

15. In a surface coater or the like, the combination of a pair of rolls, one being a main roll and the other being a doctor roll, means to ensure rotation of said rolls harmoniously and in opposite directions of rotation, means to retain said rolls in line contact with each other to thereby establish a glue pocket between the rolls, together with means to close each end of said pocket, comprising a plate at that end of the pocket having its pocket surface normal to the axes of roll rotation and with increasing contact between the roll surface and the plate surface measured in the direction of roll rotation approaching the V of the pocket, to thereby ensure gradual wiping engagement of the roll surface with the plate surface, substantially as described.

16. In a surface coater or the like, the combination of two sets of rolls, one above the other, the rolls of each set being located in the same substantially horizontal plane, means to journal the rolls of each set as a unit, a single manually adjustable device to elevate and retain the rolls of the lower set at selected elevation, spring yieldable means to normally retain the rolls of the upper set in lowered position, and permitting rising of said rolls against said spring yieldable means, together with means in conjunction with said single manually adjustable device to pre-set the same for simultaneous vertical movement of both ends of the lower set of rolls with said rolls parallel to the rolls of the upper set of rolls, substantially as described.

17. In a surface coater or the like, the combination of two sets of rolls, one above the other, the rolls of each set being located in the same substantially horizontal plane, means to journal the rolls of each set as a unit, spring means to normally retain the rolls of the upper set in lowered position but yieldable upwardly under force, together with a single device to simultaneously adjust the elevations of both ends of the lower set of rolls, and including means permitting pre-setting thereof for the two ends of the lower set of rolls to thereby bring the rolls of the lower set into parallelism with the rolls of the upper set when the rolls of the upper set are in their lowered positions, substantially as described.

18. In a surface coater, the combination of a main roll and a doctor roll, means to journal the main roll, means to journal the doctor roll, said last named journalling means being laterally movable for adjustment purposes, spring means urging the doctor roll towards the main roll, means to adjust the force of said spring means, means to limit the movement of the doctor roll towards the main roll under urge of said spring means, means to adjust said limiting means manually, and suitable indications of separation between the rolls in conjunction with said manual adjustment means last mentioned, substantially as described.

19. In a surface coater, the combination of a main roll and a doctor roll, means to journal the main roll, means to journal the doctor roll, said last named journalling means being laterally movable for adjustment purposes, spring means urging the doctor roll towards the main roll, means to adjust the force of said spring means, means to limit the movement of the doctor roll towards the main roll under urge of said spring means, and means to adjust said limiting means manually to thereby adjust the limited movement of the doctor roll towards the main roll, substantially as described.

20. In a surface coater, the combination of a main roll and a doctor roll, means to journal the main roll, a fixed yoke, a doctor roll journal movable in said yoke, an abutment movable with respect to said yoke, a spring between said abutment and the journal movable in the yoke, urging the doctor roll journal towards the main roll, means to limit movement of the said journal towards the doctor roll, manually adjustable means therefor, and means to indicate separation between the main and doctor rolls, substantially as described.

21. In a surface coater, the combination of a main roll and a doctor roll, means to journal the main roll, a fixed yoke, a doctor roll journal movable in said yoke, an abutment movable with respect to said yoke, a spring between said abutment and the journal movable in the yoke, urging the doctor roll journal towards the main roll, means to limit movement of said journal towards the doctor roll, and manually adjustable means therefor, substantially as described.

ROBERT S. BLACK.
JOHN E. BLACK.